US007162480B2

(12) United States Patent
Vishik (10) Patent No.: US 7,162,480 B2
(45) Date of Patent: Jan. 9, 2007

(54) USAGE-BASED ADAPTABLE TAXONOMY

(75) Inventor: Claire S. Vishik, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 744 days.

(21) Appl. No.: 10/033,215

(22) Filed: Dec. 26, 2001

(65) Prior Publication Data

US 2003/0120662 A1 Jun. 26, 2003

(51) Int. Cl.
G06F 7/00 (2006.01)
G06F 17/00 (2006.01)

(52) U.S. Cl. .......................................... 707/101; 707/6

(58) Field of Classification Search ................ 345/745; 706/20; 707/5, 6, 101, 102
See application file for complete search history.

(56) References Cited

U.S. PATENT DOCUMENTS

| 5,379,366 | A | | 1/1995 | Noyes .......................... 395/54 |
| 5,625,767 | A | | 4/1997 | Bartell et al. ................ 395/140 |
| 5,638,494 | A | | 6/1997 | Pinard et al. .................. 395/60 |
| 5,701,467 | A | * | 12/1997 | Freeston ...................... 707/100 |
| 5,768,580 | A | | 6/1998 | Wical .......................... 395/613 |
| 5,802,508 | A | | 9/1998 | Morgenstern ................. 706/55 |
| 5,835,905 | A | | 11/1998 | Pirolli et al. .................... 707/3 |
| 5,950,173 | A | * | 9/1999 | Perkowski .................... 705/26 |
| 6,038,560 | A | | 3/2000 | Wical ............................. 707/5 |
| 6,038,668 | A | | 3/2000 | Chipman et al. ........... 713/201 |
| 6,055,515 | A | * | 4/2000 | Consentino et al. .......... 705/27 |
| 6,112,181 | A | | 8/2000 | Shear et al. .................... 705/1 |
| 6,134,532 | A | * | 10/2000 | Lazarus et al. ............... 705/14 |
| 6,195,681 | B1 | | 2/2001 | Appleman et al. .......... 709/203 |
| 6,199,034 | B1 | | 3/2001 | Wical ............................. 704/9 |

(Continued)

FOREIGN PATENT DOCUMENTS

EP 0 742 524 A2 11/1996

(Continued)

OTHER PUBLICATIONS

Chen et al, 'PVA: a self-adaptive personal view agent system', Aug. 2001, ACM, pp. 257-262.*

(Continued)

*Primary Examiner*—Uyen Le
*Assistant Examiner*—Cheryl M Fernandes
(74) *Attorney, Agent, or Firm*—Baker Botts L.L.P.

(57) ABSTRACT

A method is disclosed for adaptably maintaining a taxonomy defined by a plurality of nodes arranged hierarchically. The method determines a threshold access value for each node of the plurality of nodes, determines a level of access value for each node of the plurality of nodes, compares the level of access value for a first node of the plurality of nodes with the threshold access value for the first node of the plurality of nodes, and if the level of access value for the first node is less than the threshold access value for the first node, merges the first node with a related node arranged laterally to the first node in the hierarchical arrangement, and compares the level of access value for the first node of the plurality of nodes with the threshold access value for a second node of the plurality of nodes, and if the level of access value for the first node is greater than the threshold access value for the second node, promotes the first node to a higher level in the hierarchical arrangement than the second node, and if the level of access value for the first node is less than the threshold access value for the second node, demotes the first node to a lower level in the hierarchical arrangement than the second node.

37 Claims, 3 Drawing Sheets

U.S. PATENT DOCUMENTS

| | | | |
|---|---|---|---|
| 6,219,826 B1 | 4/2001 | De Pauw et al. | 717/4 |
| 6,233,575 B1 | 5/2001 | Agrawal et al. | 707/6 |
| 6,243,750 B1* | 6/2001 | Verma | 709/224 |
| 6,282,538 B1 | 8/2001 | Woods | 707/5 |
| 6,286,002 B1 | 9/2001 | Axaopoulos et al. | 707/10 |
| 6,289,338 B1 | 9/2001 | Stoffel et al. | 707/3 |
| 6,292,894 B1 | 9/2001 | Chipman et al. | 713/168 |
| RE37,431 E | 10/2001 | Lanier et al. | 706/58 |
| 6,311,194 B1 | 10/2001 | Sheth et al. | 707/505 |
| 6,470,344 B1* | 10/2002 | Kothuri et al. | 707/100 |
| 6,631,496 B1* | 10/2003 | Li et al. | 715/501.1 |
| 6,742,003 B1* | 5/2004 | Heckerman et al. | 707/104.1 |
| 2001/0013087 A1* | 8/2001 | Ronstrom | 711/133 |
| 2002/0083067 A1* | 6/2002 | Tamayo et al. | 707/100 |
| 2003/0059029 A1* | 3/2003 | Mengshoel et al. | 379/265.02 |

FOREIGN PATENT DOCUMENTS

| | | |
|---|---|---|
| WO | 00/77690 | 12/2000 |

OTHER PUBLICATIONS

Fu et al, 'Reorganizing web sites based on user access patterns', Nov. 5-10, 2001, ACM, pp. 583-585.*

Spiliopoulou, 'Web usage mining for Web site evaluation', Aug. 2000, ACM, pp. 127-134.*

C. Vishik, "Enterprise Information Space: User's View, Developer's View, and Market Approach," *Proceedings of the 62nd ASIS Annual Meeting*, pp. 587-603, 1999.

* cited by examiner

USAGE-BASED ADAPTABLE TAXONOMY

TECHNICAL FIELD OF THE INVENTION

The present invention relates in general to organization of information for retrieval and, in particular, but not exclusively, to a usage-based adaptable taxonomy.

BACKGROUND OF THE INVENTION

As the volume of informational products and applications available on the World-Wide Web (WWW) has increased, the amount of useful information that may be retrieved has also increased. However, for the same reason, the difficulty of locating the information has also increased. As a result, the available information is significantly under-used. Therefore, increasing the efficiency of information retrieval is an important design goal.

Taxonomies are ordered classifications of information, which may be used for organizing information in a way that makes it more accessible for retrieval (e.g., by applications or people). The typical form of a taxonomy is hierarchical. For example, at the top levels of a hierarchy, general terms are used to describe the information. Beneath the top levels, more descriptive terms that refine the top-level terms are used. As such, a hierarchical taxonomy may be represented as a tree of information nodes, in which each node inherits all of its predecessors' attributes, and descriptive terms and other forms of metadata may be used to identify the nodes. Examples of hierarchical taxonomies are the U.S. Library of Congress' subject-heading index, product catalog databases, and WWW directories (e.g., LookSmart®).

An ontology is a vocabulary of terms including precise descriptions of what the terms mean, for the domain they describe and for the computer system, to which they relate. Taxonomies are ordered classifications of terms with support for very few relationships, while ontologies describe in more detail relationships between those terms. Ontologies used for organizing information may be created manually (by persons) or semi-automatically (by computer application).

The process of developing an ontology to organize a relatively large amount of information is exceedingly difficult and time-consuming. Also, once such an ontology has been created, the work of the ontology developers typically does not come to an end. Extensive maintenance of the ontology is required in order to maintain the usefulness of the ontology relative to that of the information in the repository involved. For example, LookSmart® (the second-largest directory on the WWW) reportedly employed about one-third of its personnel in an ontology group in 1999.

Most attempts made to organize information are based on an ideal view of a particular domain or "universe of knowledge". A classification or ontology developer can create such a view in a logical and well-documented way. Nevertheless, the resulting view is highly subjective and ultimately reflects the opinion of the developer. As mentioned above, a primary goal of organizing information is to make the information available for retrieval. However, because of the numerous different views being used for organizing information, the existing hierarchical classification approaches typically fail usability tests designed for average information users. As a result, a pressing need exists for a technique allowing the developers to adapt their views to those of the users of the system. The users include not only those directly retrieving information, but also the customers utilizing the informational products indirectly, as a foundation for placing online ads, creating online relationships, or supporting online referrals of customers.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
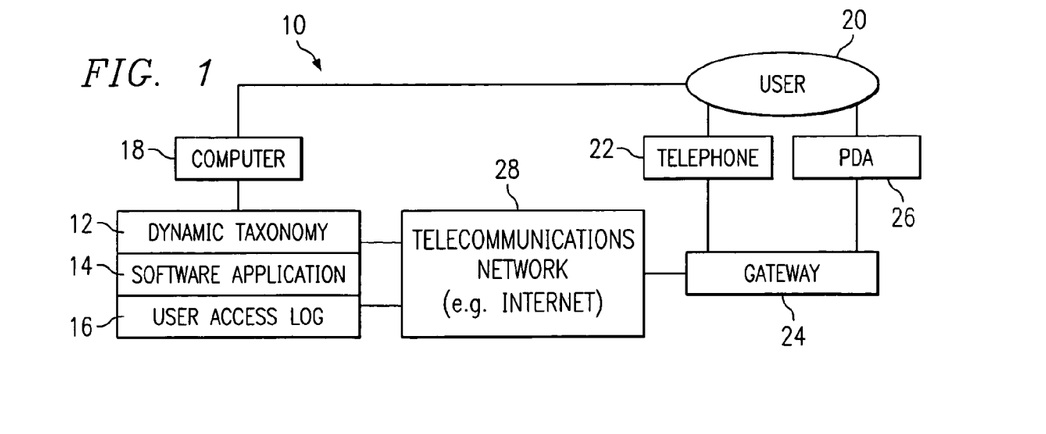
FIG. 1 illustrates an example system that may be used to implement one example embodiment of the present invention.
Figure 2A:
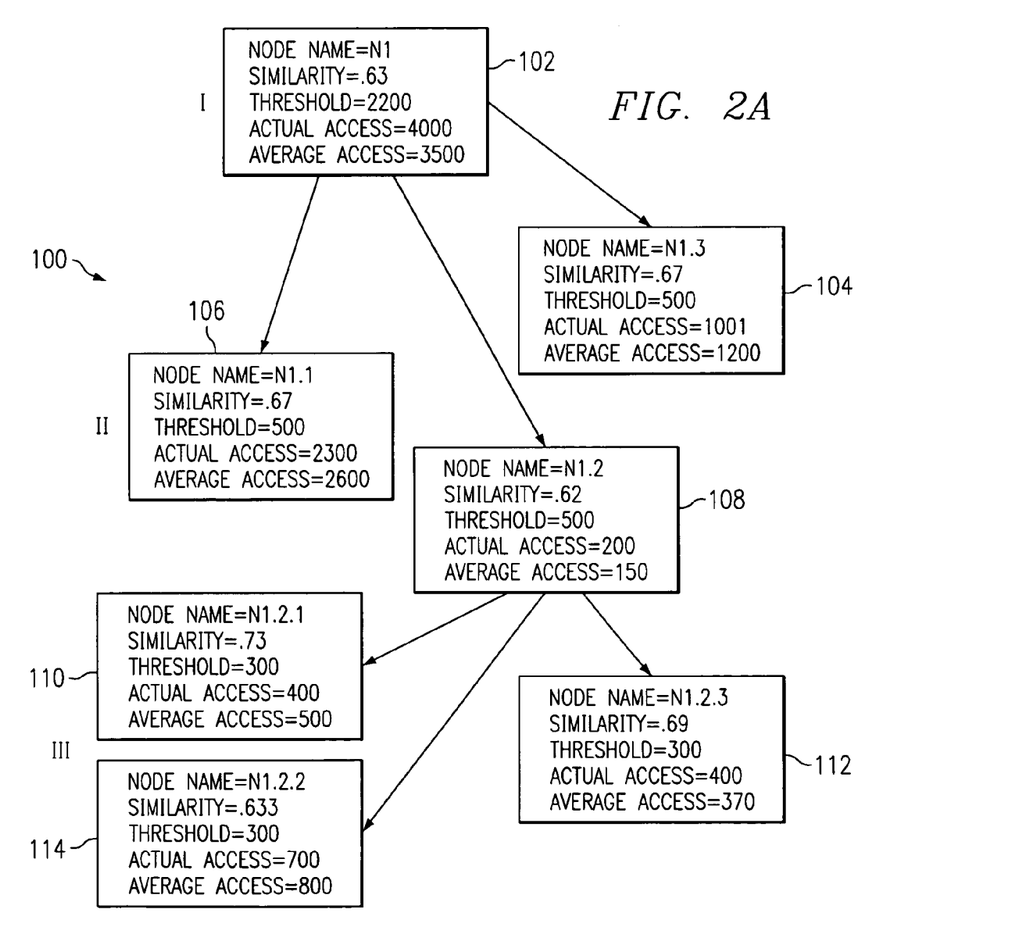
FIGS. 2A and 2B illustrate an example method that may be used to implement one example embodiment of the present invention.
Figure 2B:
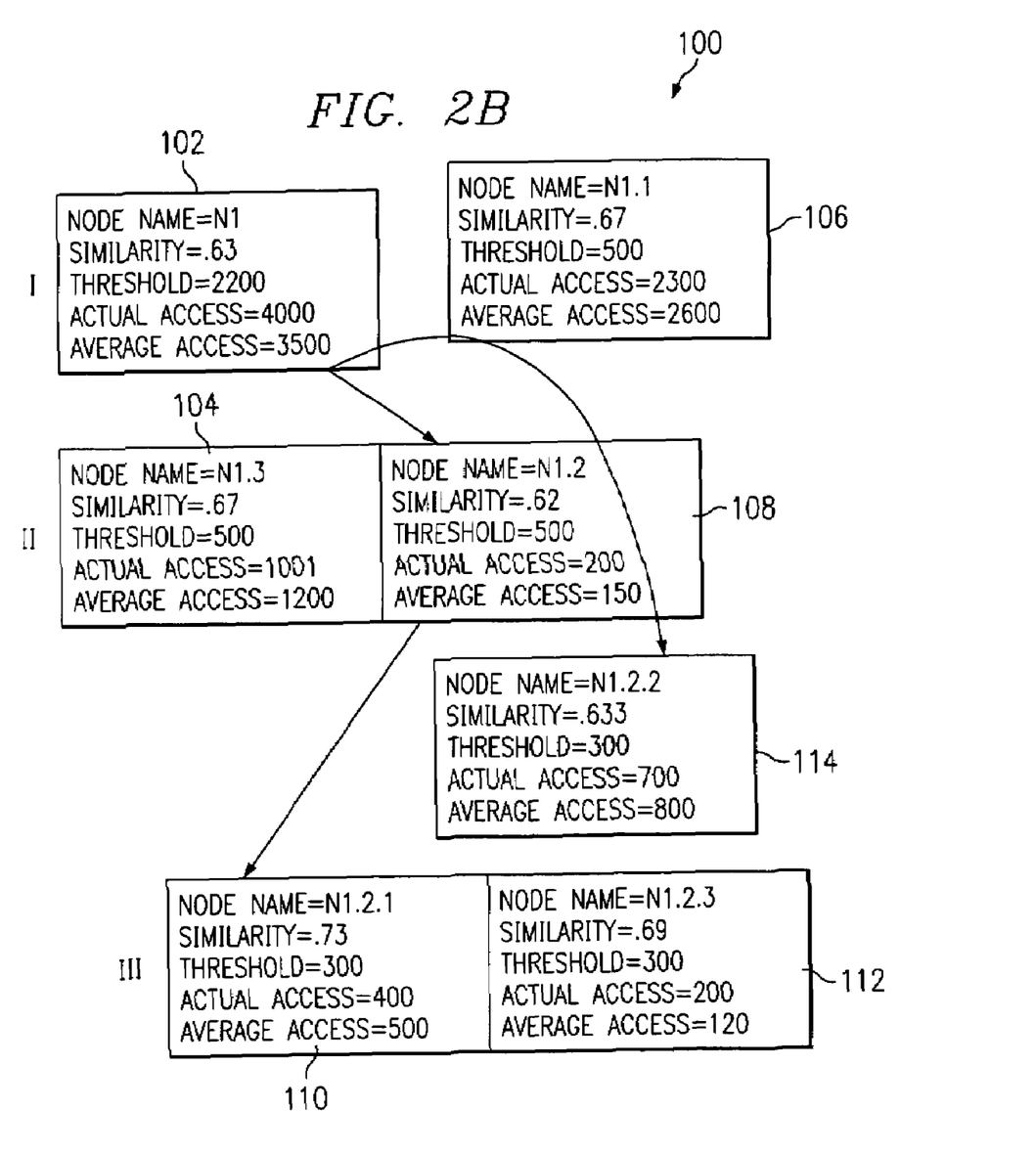
Figure 3:
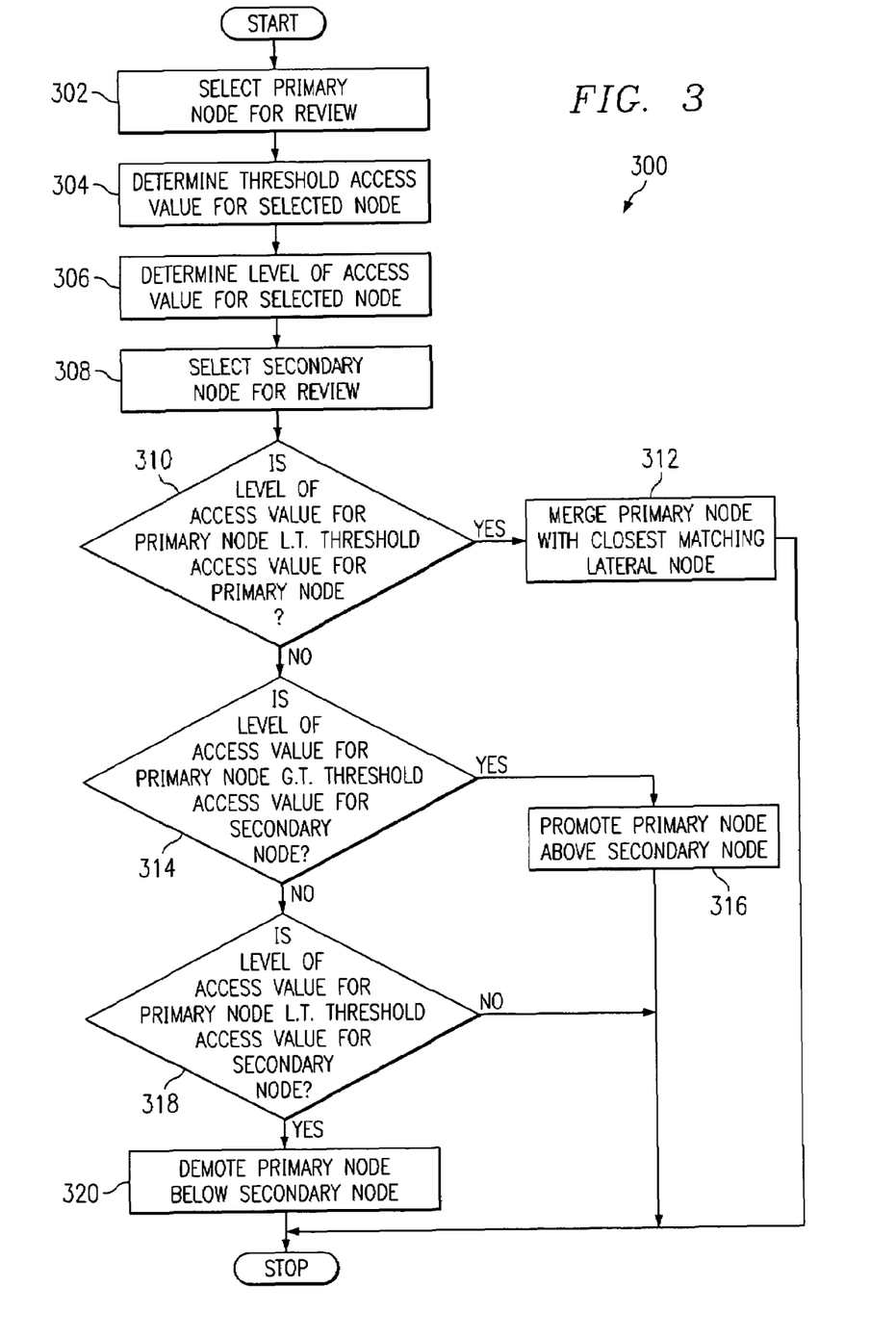
FIG. 3 illustrates an example method that may be of used to implement a second example embodiment of the present invention.

The preferred embodiment of the present invention and its advantages are best understood by referring to FIGS. 1–3 of the drawings, like numerals being used for like and corresponding parts of the various drawings.

FIG. 1 illustrates an example system 10 that may be used to implement one example embodiment of the present invention. Essentially, for this example embodiment, an assumption may be made that a static taxonomy for a particular application (e.g., product catalog database, etc.) has already been created. For example, the developed taxonomy may be a multiple inheritance taxonomy composed of a plurality of categories or classes of information (e.g., information nodes that can support additional branches or categories), and a plurality of items. Each item represents an end of a branch and thus has no sub-classes. In accordance with the present invention, once such a taxonomy has been created, the logical classification of the domain for that taxonomy advantageously may be combined with the classification representation reflected in actual patterns of usage for the information involved. In other words, the present invention may be applied to the maintenance of the taxonomy (or ontology) rather than to its creation. Advantageously, the resulting usage-based, adaptable taxonomy enables its more useful nodes to become progressively more visible (e.g., as viewed from the top down) or make associated attributes, such as price for placing ads within the node, more prominent. By adapting the taxonomy (or ontology) based on the usefulness of the nodes as illustrated by the users' needs, the efficiency of retrieval for the information involved is increased significantly over that of previous organization techniques. Also, a technique is provided for dynamically maintaining a taxonomy or ontology in a way that increases the usability of the overall systems involved. Furthermore, applications not directly related to retrieval, such as pricing of online ads or allocation of call center personnel to various tasks, can be adapted almost in real-time to the real customer needs.

Referring to FIG. 1, system 10 can include a network 28 for coupling a software application 14 with a plurality of information users (e.g., user 20). For example, network 28 may include any suitable private and/or public network capable of coupling one or more users with a software application primarily for the purpose of finding and retrieving information. In one example embodiment, network 28 may include the Internet and/or any suitable Local Area Network (LAN), Metropolitan Area Network (MAN), or Wide Area Network (WAN). Also, network 28 may include a private network within one entity (e.g., a corporation) capable of coupling one or more users with such a software application. Network 28 may also be a wireless network connected to the Internet via a gateway. Users (e.g., user 20) may access software application 14 using one or more of a variety of suitable devices, such as for example, a computer 18, telephone 22, or Personal Digital Assistant (PDA) 26. In certain instances, a user's request for information may be routed to network 28 via a gateway device 24.

Software application 14 may be a computer application executed in software (and/or firmware, etc.) by a suitable processor. For example, software application 14 may be software for any suitable business system, expert system, electronic-commerce (e-commerce) system, or information system including, but not necessarily limited to, an Internet portal, mobile radio-telephone portal, voice portal, business intelligence system, inventory system, directory, server, etc.

For one example embodiment, software application 14 may include a dynamic taxonomy component 12. Alternatively, dynamic taxonomy 12 may be a separate software application from that of software application 14 that can be integrated with a plurality of software systems. Preferably, for this example, dynamic taxonomy 12 is hierarchically structured (e.g., representing a product catalog database, WWW directory, etc.). As such, dynamic taxonomy 12 may be used as a foundation for ontology maintenance, domain modeling, and information organization, presentation, and retrieval within or associated with software application 14.

Software application 14 may also include a user access log component 16. A primary function of user access log 16 is for capturing and analyzing users, access to software application 14 within the framework of the dynamic taxonomy 12. In other words, user access log 16 can be used for tracking access by users (e.g., user 20) to software application 12 and/or dynamic taxonomy 12 in order to determine the levels of user access to nodes of dynamic taxonomy 12. User access log 16 may identify and track different users by, for example, the users' different Internet Protocol (IP) addresses, login information (e.g., login ID to access software application 14), digital certificates (e.g., signed by users), cookies (e.g., supplied initially by software application 14), tokens, or other suitable identifiers that can distinguish one user from others. Anonymous tracking may be sufficient for this application. In other words, the identity of a user can be irrelevant for this application; the functionality is preferably based on distinguishing between identical and different users. Thus, users' privacy issues do not complicate the tracking. Similar to dynamic taxonomy 12, user access log 16 may be a separate application from that of software application 14. Furthermore, the functions of maintaining a dynamic taxonomy, determining levels of access to nodes in a dynamic taxonomy, and enabling access for retrieval of information associated with the nodes in a dynamic taxonomy may be performed by a processor executing instructions for a single software application (e.g., dynamic taxonomy 12).

In operation, software application 14 may be used for designing an initial taxonomy or ontology for classification of information to be accessed by one or more users 20. Such an initial taxonomy or ontology may be created manually or automatically. Typically, a taxonomy created automatically (e.g., by a software application) may be produced from a collection of informational documents using one or more statistical algorithms to optimize the organization of the information for retrieval. Additionally, existing taxonomies or ontologies can be imported from other applications. A set of initial threshold values may be provided for users to access the nodes of the taxonomy. The initial threshold values may be provided as a set of default settings based, for example, on the size of the taxonomy or ontology and a projected number of accesses that may be made (e.g., information imported from a predecessor application or created manually). These threshold values may be adjusted empirically as the system continues operation.

In accordance with the present invention, as users 20 begin accessing software application 14 for retrieval of information (broadly understood), dynamic taxonomy 12 can be changed appropriately to reflect the level of user access to the various nodes (e.g., as monitored by user access log 16). These self-maintenance operations of dynamic taxonomy 12 can include, but are not necessarily limited to, certain adaptive operations such as promoting, demoting, lateral merging, retiring, or reinstating of nodes. Depending on the nature of the system to which the dynamic taxonomy 12 is associated, various formulas and algorithms may be used to assess the prominence or usefulness of the nodes. However, for one example embodiment, a value for a level of user access to a node may be computed based on the sum of the accesses to that node and its children (e.g., viewing top-down for a predefined number of genealogical levels), and the sum of the searches performed in which that node or its contents have been displayed in the search results.

For information and retrieval systems, synonyms and related terms provided in users' requests for information (e.g., search queries) may be included in order to determine a value for a level of access to a node. For example, a value for a level of access to a node may include information about the actual retrieval of the node, the number of searches by different users that can retrieve the node and/or its children, and synonyms that can be used to retrieve the node and/or its children.

In systems containing user profiles, a prominent feature in the profiles that influence the levels of access can be represented by access devices that are the most frequently used. For example, the prominence of a node can be defined by the frequency of retrieval from that node by applications that consume user profiles and also take into consideration the routing to a device. As a result, requests for user profiles from a department at one company (e.g., SBC Communications, Inc.) that originate from another company's devices (e.g., Nokia's cell phones) may be more expensive because these profiles are the most frequently used.

FIGS. 2A and 2B illustrate an example method 100 that may be used to implement one example embodiment of the present invention. For this example, FIG. 2A illustrates an example initial taxonomy that may be created by software application 14 (FIG. 1). Also for this example, FIG. 2B illustrates an example dynamic taxonomy that may be created by dynamic taxonomy 12 and represents how the taxonomy of FIG. 2A can be maintained and adapted for more efficient information retrieval based on usage information.

For example, each node representing a category or class (e.g., node that can support additional branches or categories) includes properties that define proximity to different lateral nodes in the same category (e.g., I, II, III), threshold of access by different users, and usage values (e.g., determined using IP addresses, tokens, cookies, etc. associated with different users, and metadata including synonyms where applicable). The proximity to other lateral nodes may be assigned by the taxonomy developer, or based on a measurement of the similarity of contents for each of the nodes at the same level of a hierarchy within a category (e.g., one of the nodes can be used as a "benchmark node" for a category, and the remaining nodes can be measured in terms of similarity to the benchmark node).

User access may be measured (e.g., by user access log 16) by the number of different IP addresses for users accessing a node or any item or category within that node during a predetermined interval of time (e.g., per day) plus the number of searches performed in which a node or its contents have been displayed in the results. If a node has a multiple inheritance (e.g., can be viewed or accessed from multiple categories), a suitable adjustment to account for the multiple inheritance can be made. Nodes with multiple inheritance may be merged, promoted or demoted only within the path where the threshold values have changed. Threshold values can be different for nodes at different levels in the taxonomy. The threshold values may be defined by the taxonomy developer.

When user access to a node is determined to have been below the node's threshold value for a predetermined interval of time (e.g., five days), that node may be eliminated or retired, and its contents inserted into the closest matching lateral node. However, the properties of the contents of an eliminated or retired node (now contained in the lateral node) can include a hidden reference to the eliminated node so that node can be reinstated if user access to the contents increases to a predefined value. If the score of a node increases to a value that is greater than the threshold value for the next level in the hierarchy within a category, that node and its contents can be moved to the next (higher) level (e.g., after a predetermined interval of time).

In comparing the initial taxonomy in FIG. 2A with the dynamic taxonomy result in FIG. 2B, node N1.1 106 includes an actual access value of 2300, which is greater than the threshold value (2200) of parent node N1 102. Consequently, as shown in FIG. 2B, node N1.1 106 has been promoted to the next higher level (I) in the dynamic taxonomy. Also, node N1.2.2 114 includes an actual access value of 700, which is greater than the threshold values of both node N1.2.1 110 and node N1.2.3 112. Consequently, node N1.2.2 114 has been promoted to the next higher level (II) in the dynamic taxonomy. Furthermore, referring to FIG. 2B, node N1.2 108 includes an actual access value of 200, which is less than its threshold value of 500. Consequently, node N1.2 108 has been merged with its closest matching lateral node N1.3 104. Also, node N1.2.3 112 includes an actual access value of 200, which is less than its threshold value of 300. Consequently, node N1.2.3 112 has been merged with its closest matching lateral node N1.2.1 110. If desired, merged nodes N1.2 108 and N1.2.3 112 may be eliminated or retired, and their respective contents inserted into nodes N1.3 104 and N1.2.1 110. However, as mentioned above, if these nodes are eliminated, they may be reinstated if user access to their respective contents increases to predetermined levels.

FIG. 3 illustrates an example method 300 that may be used to implement a second example embodiment of the present invention. For example, method 300 may be executed as a software application and used in conjunction with system 10 (FIG. 1) to implement some or all of the functions described above with respect to FIGS. 2A and 2B. At step 302, a primary node (e.g., in the static taxonomy in FIG. 2A) is selected for review. The selection may be made, for example, by software application 14 in FIG. 1. At step 304, the threshold (user) access value is determined for the selected node. For example, the threshold access value for node 108 is 500. At step 306, the (user) actual level of access value is determined for the selected node. For example, the actual level of access value for node 108 is 200. At step 308, a secondary node is selected for review.

At step 310, a comparison is made of the primary node's (user) actual level of access value and (user) threshold access value. If the primary node's actual level of access value is less than its threshold access value, then at step 312, the primary node can be merged with the closest matching lateral node. For example, the actual level of access value (200) for node 108 is less than its threshold access value (500). Consequently, node 108 can be merged with the closest matching lateral node 104, as shown in FIG. 2B. Similarly, the actual level of access value (200) for node 112 is less than its threshold access value (300). Consequently, node 112 can be merged with its closest matching lateral node 110, as shown in FIG. 2B.

Returning to step 310, if the primary node's actual level of access value is not less than its threshold access value, then at step 314, a comparison is made of the primary node's (user) actual level of access value and the secondary node's (user) threshold access value. If the primary node's actual level of access value is greater than the secondary node's threshold access value, then at step 316, the primary node may be promoted above the secondary node to the next higher level in the dynamic taxonomy. For example, node 106 includes an actual level of access value of 2300, which is greater than the threshold value (2200) of parent node 102. Consequently, node 106 can be promoted above node 102 to the next higher level in the dynamic taxonomy (FIG. 2B).

Otherwise, at step 318, if the primary node's actual level of access value is less than the secondary node's threshold access value, then at step 320, the primary node may be demoted below the secondary node to the next lower level in the dynamic taxonomy. For example, node 108 includes an actual level of access value of 200, which is less than the threshold value (300) of node 110. Consequently, node 108 can be demoted below node 110 to the next lower level in the dynamic taxonomy.

In accordance with the present invention, an example application for a dynamic taxonomy can be a dynamic pricing map. For example, "smartpages.com" (SBC's Web-based Yellow Pages directory) sells advertising to its customers via the Internet when the customers access, search for, and retrieve information from a smartpages.com web page. Typically, the prices advertised on the web page are static, similarly to the approach maintained in a hard copy (paper) directory. Advertisements for companies local to an information requester are displayed by smartpages.com when the requester's listing is part of the retrieved search results, and national advertisements can be linked to keywords in the search request and displayed. However, the popularity of the products and services being advertised can change rapidly based on a variety of different events.

For example, the sales of can flashlights skyrocket in affected communities after serious floods, and the need for roofing service companies increases significantly after hailstorms. When the demand for products and services increases (and as a result, Internet access levels increase), more advertising leads are generated and the cost for advertising becomes more expensive. As a result, smartpages.com (and/or SBC Communications, Inc.) should receive increased advertising revenues to reflect greater utility of advertising to the customers. Also, advertising accounts could be created on "as-needed" bases with a more dynamic pricing system. In accordance with the present invention, a usage based, dynamic taxonomy adapts more readily to product and service popularity fluctuations than existing static taxonomies and thereby can increase advertising revenues.

More specifically, a static taxonomy presently used for the Yellow Pages® may be upgraded for smartpages.com to include access thresholds for informational nodes, and a field representing an advertising price per interval of time (e.g., price per day). The initial static taxonomy and the resulting, usage-based dynamic Yellow Pages taxonomy may reside in a suitable database (e.g., Oracle® database). As additional metadata for the dynamic taxonomy, the taxonomy's categories can include certain search terms associated with the nodes. A price per day value for a node may be computed based on access data derived for that node for a day, and can take into consideration the number of advertisers products or services contained within that node. For example, the higher the number of advertisers associated with a node, the lower the price for that node, but the higher the level of access computed for that node, the higher the price for that node. As such, in addition to running local ads associated only with search results, taxonomies such as smartpages.com may also offer node-based ads including dynamic pricing based on levels of access to the nodes.

Additionally, a usage-based, self-maintaining taxonomy (e.g., dynamic taxonomy for Yellow Pages) can also include a self-maintaining dynamic ad price scheme. As a result, customers can place advertisements for as short a period as one day (if desired). For example, roofing services companies and building contractors located in a particular community can purchase advertising directly after a hailstorm has occurred. These companies can be charged for these ads according to the levels of access to the nodes (pages) and number of companies advertising there. Furthermore, in accordance with the present invention, if access levels to an advertiser's (e.g., roofing company) node surpass the threshold set for that node at that level in the hierarchy, that node can be promoted to the next (higher) level in the hierarchy and thus becomes more visible (e.g., more expensive for the advertiser). When the strong need for the advertiser's services decline, access to that advertiser's node may drop below the threshold value set for that level in the hierarchy, and that node may be demoted to a lower level in the hierarchy. As a result, the price for placing ads on this node can decrease. An advertiser can have the option of staying with that node at a lower cost, or migrate to higher access nodes (e.g., higher in the hierarchy) and pay higher advertising fees.

The dynamic pricing map described above can include a user interface whereby the customers can set up, retire, or move their ads, as well as receive daily reports about the price of advertising and levels of access for nodes of interest. The dynamic pricing map also includes a viewable, expandable map reflecting the current "payscape" for the taxonomy involved. This payscape may be color-coded if the prices are to be differentiated within a few pricing ranges (e.g., nodes color-coded "red" may represent $x per 1000 views today, while nodes color-coded "blue", may represent $y per 1000 views today, etc.).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer implemented method for adaptably maintaining a taxonomy defined by a plurality of nodes arranged hierarchically, the method comprising the steps of:
   determining a threshold access value for each node of said plurality of nodes;
   determining a level of access value for each node of said plurality of nodes;
   comparing said level of access value for a first node of said plurality of nodes with said threshold access value for said first node of said plurality of nodes, and if said level of access value for said first node is less than said threshold access value for said first node, merging said first node with a related non-parent node arranged laterally to said first node in said hierarchical arrangement; and
   comparing said level of access value for said first node of said plurality of nodes with said threshold access value for a second node of said plurality of nodes, and if said level of access value for said first node is greater than said threshold access value for said second node, promoting said first node to a higher level in said hierarchical arrangement than said second node, and if said level of access value for said first node is less than said threshold access value for said second node, demoting said first node to a lower level in said hierarchical arrangement than said second node.

2. The method of claim 1, wherein said threshold access value comprises a threshold user access value, said level of access value comprises a level of user access value, and said user includes at least a person, automatic browsing device, or data collection device.

3. The method of claim 1, wherein said level of access value for each node comprises usage of information content associated with each node.

4. The method of claim 1, wherein the step of determining a level of access value for each node comprises determining a sum of user access requests to each node and at least one child of said each node plus a sum of searches or queries performed wherein a result of said searches or queries includes at least one of said each node or a content of said at least one of said each node.

5. The method of claim 1, wherein the step of merging said first node with a related node arranged laterally to said first node in said hierarchical arrangement comprises retiring said first node and combining a content of said first node with a content of said related node.

6. The method of claim 1, wherein said related node arranged laterally to said first node comprises a node arranged in parallel and in a same category with said first node.

7. The method of claim 1, wherein said plurality of nodes arranged hierarchically comprises a tree structure.

8. The method of claim 1, wherein said taxonomy comprises a top-down multilevel taxonomy.

9. The method of claim 1, wherein said related node is identified by a proximity feature associated with said first node and said related node.

10. The method of claim 1, wherein said level of access value comprises at least a sum of IP addresses computed for a predetermined interval of time.

11. The method of claim 1, wherein said level of access value comprises at least a sum of different IP addresses computed for a predetermined interval of time.

12. The method of claim 1, wherein said level of access value comprises at least a sum of different identifiers computed for a predetermined interval of time.

13. The method of claim 1, wherein said taxonomy comprises a product catalog database.

14. The method of claim 1, wherein said taxonomy comprises a WWW directory.

15. The method of claim 1, wherein said taxonomy comprises advertisement pricing information.

16. The method of claim 1, wherein said taxonomy comprises a dynamic pricing map based on usage.

17. The method of claim 1, wherein said taxonomy comprises a call center resources allocation map based on usage.

18. A computer implemented method for maintaining a dynamic taxonomy, the method comprising the steps of:
determining a threshold usage value for each node of a plurality of nodes of said dynamic taxonomy;
determining an actual usage value for each node of said plurality of nodes;
comparing said actual usage value for a first node of said plurality of nodes with said threshold usage value for said first node of said plurality of nodes, and if said actual usage value for said first node is less than said threshold usage value for said first node, merging said first node with a related non-parent lateral node.

19. The method of claim 18, further comprising the steps of:
comparing said actual usage value for said first node of said plurality of nodes with said threshold usage value for a second node of said plurality of nodes; and
if said actual usage value for said first node is greater than said threshold usage value for said second node, promoting said first node to a higher level than said second node in a hierarchy associated with said dynamic taxonomy.

20. The method of claim 18, further comprising the steps of:
comparing said actual usage value for said first node of said plurality of nodes with said threshold usage value for a second node of said plurality of nodes; and
if said actual usage value for said first node is less than said threshold usage value for said second node, demoting said first node to a lower level than said second node in a hierarchy associated with said dynamic taxonomy.

21. Logic encoded in a computer-readable media for adaptably maintaining a taxonomy defined by a plurality of nodes arranged hierarchically, and operable to:
determine a threshold access value for each node of said plurality of nodes;
determine a level of access value for each node of said plurality of nodes;
compare said level of access value for a first node of said plurality of nodes with said threshold access value for said first node of said plurality of nodes, and if said level of access value for said first node is less than said threshold access value for said first node, merge said first node with a related non-parent node arranged laterally to said first node in said hierarchical arrangement.

22. The logic of claim 21, further operable to:
compare said level of access value for said first node of said plurality of nodes with said threshold access value for a second node of said plurality of nodes; and
if said level of access value for said first node is greater than said threshold access value for said second node, promote said first node to a higher level in said hierarchical arrangement than said second node.

23. The logic of claim 21, further operable to:
compare said level of access value for said first node of said plurality of nodes with said threshold access value for a second node of said plurality of nodes; and
if said level of access value for said first node is less than said threshold access value for said second node, demote said first node to a lower level in said hierarchical arrangement than said second node.

24. A computer-implemented system for adaptably maintaining a taxonomy defined by a plurality of nodes arranged hierarchically, comprising:
a processor; and
a data storage unit coupled to said processor, said data storage unit operable to store said taxonomy, said processor in association with said data storage unit operable to:
determine a threshold access value for each node of said plurality of nodes;
determine a level of access value for each node of said plurality of nodes;
compare said level of access value for a first node of said plurality of nodes with said threshold access value for said first node of said plurality of nodes, and if said level of access value for said first node is less than said threshold access value for said first node, merge said first node with a related non-parent node arranged laterally to said first node in said hierarchical arrangement; and
compare said level of access value for said first node of said plurality of nodes with said threshold access value for a second node of said plurality of nodes, and if said level of access value for said first node is greater than said threshold access value for said second node, promote said first node to a higher level in said hierarchical arrangement than said second node, and if said level of access value for said first node is less than said threshold access value for said second node, demote said first node to a lower level in said hierarchical arrangement than said second node.

25. The system of claim 24, wherein said level of access value for each node comprises usage of information content associated with each node.

26. The system of claim 24, wherein determining a level of access value for each node comprises determining a sum of user access requests to each node and at least one child of said each node plus a sum of searches performed wherein a result of said searches includes at least one of said each node or a content of said at least one of said each node.

27. The system of claim 24, wherein merging said first node with a related node arranged laterally to said first node in said hierarchical arrangement comprises retiring said first node and combining a content of said first node with a content of said related node.

28. The system of claim 24, wherein said related node arranged laterally to said first node comprises a node arranged in parallel and in a same category with said first node.

29. The system of claim 24, wherein said plurality of nodes arranged hierarchically comprises a tree structure.

30. The system of claim 24, wherein said taxonomy comprises a top-down multilevel taxonomy.

31. The system of claim 24, wherein said related node is identified by a proximity feature associated with said first node and said related node.

32. The system of claim 24, wherein said level of access value comprises at least a sum of IP addresses computed for a predetermined interval of time.

33. The system of claim 24, wherein said taxonomy comprises a product catalog database.

34. The system of claim 24, wherein said taxonomy comprises a WWW directory.

35. The system of claim 24, wherein said taxonomy comprises advertisement pricing information.

36. The system of claim 24, wherein said taxonomy comprises a dynamic pricing map based on usage.

37. A computer implemented system for adaptably maintaining a taxonomy defined by a plurality of nodes arranged hierarchically, comprising:
- means for determining a threshold access value for each node of said plurality of nodes;
- means for determining a level of access value for each node of said plurality of nodes;
- means for comparing said level of access value for a first node of said plurality of nodes with said threshold access value for said first node of said plurality of nodes, and if said level of access value for said first node is less than said threshold access value for said first node, merging said first node with a related non-parent node arranged laterally to said first node in said hierarchical arrangement; and
- means for comparing said level of access value for said first node of said plurality of nodes with said threshold access value for a second node of said plurality of nodes, and if said level of access value for said first node is greater than said threshold access value for said second node, promoting said first node to a higher level in said hierarchical arrangement than said second node, and if said level of access value for said first node is less than said threshold access value for said second node, demoting said first node to a lower level in said hierarchical arrangement than said second node.

* * * * *